US012123336B2

(12) United States Patent
Nam (10) Patent No.: US 12,123,336 B2
(45) Date of Patent: Oct. 22, 2024

(54) APPARATUS FOR REDUCING GREENHOUSE GAS EMISSION IN VESSEL AND VESSEL INCLUDING THE SAME (71) Applicant: DAEWOO SHIPBUILDING & MARINE ENGINEERING CO., LTD., Geoje-si (KR)

(72) Inventor: Byung Tak Nam, Geoje-si (KR)

(73) Assignee: DAEWOO SHIPBUILDING & MARINE ENGINEERING CO., LTD., Geoje-si (KR)

( * ) Notice: Subject to any disclaimer, the term of this patent is extended or adjusted under 35 U.S.C. 154(b) by 257 days.

(21) Appl. No.: 17/923,223

(22) PCT Filed: Dec. 17, 2020

(86) PCT No.: PCT/KR2020/018600
§ 371 (c)(1),
(2) Date: Nov. 3, 2022

(87) PCT Pub. No.: WO2021/261691
PCT Pub. Date: Dec. 30, 2021

(65) Prior Publication Data
US 2023/0184152 A1   Jun. 15, 2023

(30) Foreign Application Priority Data

Jun. 24, 2020 (KR) .................. 10-2020-0077213
Oct. 13, 2020 (KR) .................. 10-2020-0132184

(51) Int. Cl.
*F01N 3/20*   (2006.01)
*B01D 53/14*   (2006.01)
(Continued)

(52) U.S. Cl.
CPC ......... *F01N 3/206* (2013.01); *B01D 53/1406* (2013.01); *B01D 53/18* (2013.01);
(Continued)

(58) Field of Classification Search
CPC ............... F01N 13/004; F01N 2570/04; F01N 2570/10; F01N 2570/14; F01N 2590/00;
(Continued)

(56) References Cited

U.S. PATENT DOCUMENTS

2014/0178276 A1* 6/2014 Guidolin ................. F23L 15/04
423/220
2014/0356267 A1* 12/2014 Hunwick ............... B01D 53/80
423/220
2016/0312676 A1* 10/2016 Youssef ............... B01D 71/024

FOREIGN PATENT DOCUMENTS

JP    S62-170469 A    7/1987
JP    2011-524800 A    9/2011
(Continued)

OTHER PUBLICATIONS

International Search Report in International Application No. PCT/KR2020/018600, dated Mar. 5, 2021, 3pages.

*Primary Examiner* — Anthony Ayala Delgado
(74) *Attorney, Agent, or Firm* — Park, Kim & Suh, LLC (57) ABSTRACT The present invention relates to an apparatus for reducing greenhouse gas emission in a vessel, and a vessel including the same, which are capable of satisfying IMO greenhouse gas emission regulations by separating and discharging $NO_X$, $SO_X$, and $CO_2$ from exhaust gas exhausted from a vessel engine and increasing $CO_2$ solubility and $CO_2$ removal efficiency by removing $CO_2$ after removing $SO_X$.

20 Claims, 9 Drawing Sheets (51) Int. Cl.
*B01D 53/18* (2006.01)
*F01N 3/04* (2006.01)

(52) U.S. Cl.
CPC ............ *F01N 3/04* (2013.01); *F01N 3/2073* (2013.01); *F01N 2570/04* (2013.01); *F01N 2570/10* (2013.01); *F01N 2570/14* (2013.01); *F01N 2590/02* (2013.01); *F01N 2610/01* (2013.01); *F01N 2610/02* (2013.01)

(58) Field of Classification Search
CPC ............ F01N 2590/02; F01N 2610/01; F01N 2610/02; F01N 3/04; F01N 3/0842; F01N 3/085; F01N 3/0857; F01N 3/206; F01N 3/2073; Y02C 20/40
See application file for complete search history.

(56) References Cited

FOREIGN PATENT DOCUMENTS

| | | |
|---|---|---|
| JP | 2013-189937 A | 9/2013 |
| JP | 2015-536237 A | 12/2015 |
| JP | 2016-514038 A | 5/2016 |
| JP | 2019-510628 A | 4/2019 |
| KR | 10-2013-0078308 A | 7/2013 |
| KR | 10-2015-0075663 A | 7/2015 |
| KR | 10-2016-0079801 A | 7/2016 |
| KR | 10-2017-0010192 A | 1/2017 |
| KR | 10-2019-0113486 A | 10/2019 |

\* cited by examiner

APPARATUS FOR REDUCING GREENHOUSE GAS EMISSION IN VESSEL AND VESSEL INCLUDING THE SAME

CROSS-REFERENCE TO RELATED APPLICATIONS

This application is the National Stage filing under 35 U.S.C. 371 of International Application No. PCT/KR2020/018600, filed on Dec. 17, 2020, which claims the benefit of Korean Patent Application No. 10-2020-0077213, filed on Jun. 24, 2020 and Korean Patent Application No. 10-2020-0132184, filed on Oct. 13, 2020, the contents of which are all hereby incorporated by reference herein in their entirety.

FIELD OF THE INVENTION

The present invention relates to an apparatus for reducing greenhouse gas emission in a vessel, and a vessel including the same, which are capable of satisfying IMO greenhouse gas emission regulations by separating and discharging $NO_X$, $SO_X$, and $CO_2$ from exhaust gas exhausted from a vessel engine and increasing $CO_2$ solubility and $CO_2$ removal efficiency by removing $CO_2$ after removing $SO_X$.

DESCRIPTION OF THE RELATED ART

Recently, global warming and related environmental disasters have occurred due to the influence of greenhouse gas emission caused by indiscriminate use of fossil fuels.

In this regard, a series of technologies related to capture and storage of carbon dioxide, which is the representative greenhouse gas, without carbon dioxide emission are called carbon dioxide capture and storage (CCS) technologies. In recent years, CCS technologies have attracted much attention. Among CCS technologies, chemical absorption is the most commercialized technology in terms of enabling large-scale treatment.

In addition, carbon dioxide emission is regulated through the IMO's EEDI. The IMO is targeting a reduction of 50% or more in emissions by 2050 compared to 2008 and a reduction of 40% in emissions by 2030 compared to 2008. Therefore, technologies that do not emit $CO_2$ or capture emitted $CO_2$ are attracting attention.

For reference, among the carbon dioxide capture and storage (CCS) technologies for directly capturing and storing carbon dioxide, a $CO_2$ capture technology may be approached in various ways according to $CO_2$ generation conditions of target processes. Current representative technologies are an absorption method, an adsorption method, and a membrane separation method. Among them, the wet absorption method has high technological maturity in onshore plants and may easily process $CO_2$ in large quantities. Therefore, the wet absorption method may be said to be the closest capture technology to commercialization of CCS technology. As an absorbent agent, amines and ammonia are mainly used.

On the other hand, the above-described technologies for reducing carbon dioxide emission or capturing generated carbon dioxide are not currently commercialized in vessels, and methods of using hydrogen or ammonia as fuel are currently under development and have not reached the level of commercialization.

In particular, in vessels equipped with a scrubber so as to use high sulfur oil, since the solubility of $SO_X$ is high, $SO_X$ is first changed to a compound of $NaSO_3$. Therefore, it is difficult to remove $CO_2$ until $SO_X$ is completely dissolved.

In this regard, the need is raised to apply, to vessels using fossil fuels, a technology for converting $CO_2$, which is one of exhaust gases discharged from a vessel engine, into materials that do not affect environments, discharging the materials, or converting the materials into useful materials and storing the useful materials.

SUMMARY OF THE INVENTION

Technical Problem

An object of the present invention is to provide an apparatus for reducing greenhouse gas emission in a vessel and a vessel including the same, which are capable of satisfying IMO greenhouse gas emission regulations by separating and discharging $NO_X$, $SO_X$, and $CO_2$ from exhaust gas, increasing $CO_2$ solubility and $CO_2$ removal efficiency by removing $CO_2$ after removing $SO_X$, reducing the $NH_3$ recycling cost by using $Ca(OH)_2$ or $Mg(OH)_2$, reducing the capacity size of the rear end part of the filter, and reducing the removal cost because only $NH_3$ and $Ca(OH)_2$ or $Mg(OH)_2$ is consumed during $CO_2$ removal.

Technical Solution

In order to achieve the above object, an apparatus for reducing greenhouse gas emission in a vessel includes: a seawater supply unit that supplies seawater; an ammonia water producing unit that reacts fresh water with $NH_3$ to produce and supply ammonia water; an absorption tower including a $CO_2$ removing unit that cools exhaust gas discharged from a vessel engine by reacting the exhaust gas with the seawater supplied from the seawater supply unit, and removes $CO_2$ by reacting the cooled exhaust gas with the ammonia water supplied from the ammonia water producing unit to convert $CO_2$ into $NH_4HCO_3(aq)$; and an ammonia recycling unit that recycles $NH_3$ by reacting $NH_4HCO_3(aq)$ discharged from the absorption tower with $Ca(OH)_2$ or $Mg(OH)_2$, and returns the recycled $NH_3$ back to the ammonia water producing unit.

In addition, the absorption tower may further include a $NO_X$ absorbing unit that absorbs and removes $NO_X$ of the exhaust gas discharged from the vessel engine, the $CO_2$ removing unit may cool the exhaust gas, from which the $NO_X$ is removed, by reacting the exhaust gas with the seawater supplied from the seawater supply unit, and remove $CO_2$ by reacting the cooled exhaust gas with the ammonia water supplied from the ammonia water producing unit to convert $CO_2$ into $NH_4HCO_3(aq)$, and the ammonia recycling unit may recycle $NH_3$ and return the recycled $NH_3$ back to the ammonia water producing unit and the $NO_X$ absorbing unit.

In addition, the absorption tower may further include a $SO_X$ absorbing unit that dissolves and removes $SO_X$ while cooling the exhaust gas discharged from the vessel engine by reacting the exhaust gas with the seawater supplied from the seawater supply unit, and the $CO_2$ removing unit may remove $CO_2$ by reacting the exhaust gas, from which the $SO_X$ is removed, with the ammonia water supplied from the ammonia water producing unit to convert $CO_2$ into $NH_4HCO_3(aq)$.

In addition, in the absorption tower, a $NO_X$ absorbing unit that absorbs and removes $NO_X$ from the exhaust gas discharged from the vessel engine, a $SO_X$ absorbing unit that dissolves and removes $SO_X$ while cooling the exhaust gas, from which the $NO_X$ has been removed, through reaction with the seawater supplied from the seawater supply unit, and the $CO_2$ removing unit that removes $CO_2$ by reacting the exhaust gas, from which the $SO_X$ has been removed, with the ammonia water supplied from the ammonia water producing unit to convert $CO_2$ into $NH_4HCO_3(aq)$ may be stacked, and the ammonia recycling unit may recycle $NH_3$ and return the recycled $NH_3$ back to the ammonia water producing unit and the $NO_X$ absorbing unit.

In addition, the seawater supply unit may include: a seawater pump that receives seawater from the outside of the vessel through a sea chest and pumps the seawater to the $SO_X$ absorbing unit; and a control valve that controls a flow rate of the seawater supplied from the seawater pump according to an amount of the exhaust gas.

In addition, the ammonia water producing unit may include: a fresh water tank that stores fresh water; a fresh water pump that pumps and supplies the fresh water from the fresh water tank; an ammonia water production tower including a tower tank, a $NH_3$ spray nozzle that is formed at a lower end of the tower tank and sprays $NH_3$ upward, a fresh water spray nozzle that is formed at an upper end of the tower tank and sprays the fresh water from the fresh water pump downward, a first packing material that is formed between the $NH_3$ spray nozzle and the fresh water spray nozzle and contacts the fresh water with $NH_3$ to dissolve $NH_3$ and generate ammonia water, and a cooling jacket that cools heat generated by the tower tank due to a dissolution reaction; and an ammonia water pump that supplies ammonia water from an ammonia water storage tank, which stores ammonia water drained to a lower end of the ammonia water production tower, to an upper end of the $CO_2$ removing unit.

In addition, the ammonia water production tower may include a mist removal plate that is formed at the upper end of the tower tank in a curved multi-plate shape and returns mist scattered from the fresh water toward the first packing material.

In addition, the apparatus may further include a $NH_3$ supply pipe through which $NH_3$ exhausted to the upper end of the ammonia water production tower is supplied to an lower end of the $CO_2$ removing unit.

In addition, the first packing material may include multi-stage distilling column packings designed to increase a contact area per unit volume.

In addition, a solution redistributor may be formed between the multi-stage distilling column packings.

In addition, a diameter and a height of the tower tank may be designed so that a flow velocity of the fresh water and a flow velocity of the $NH_3$ are ½ of a flooding velocity.

In addition, the loss and lack of $NH_3$ may be compensated for by supplying $NH_3$ from the ammonia recycling unit through the $NH_3$ spray nozzle of the ammonia water producing unit or supplying $NH_3$ from a separate $NH_3$ storage tank when the loss and lack of $NH_3$ occur.

In addition, the $NO_X$ absorbing unit may directly receive $NH_3$ from the ammonia recycling unit through a blower or a compressor and spray the received $NH_3$ to a first $NH_3$ spray nozzle, or when $NH_3$ is insufficient, the $NO_X$ absorbing unit may receive urea water of a urea water storage tank through a urea water supply pump and spray the received urea water to a second $NH_3$ spray nozzle so as to compensate for the lack of $NH_3$.

In addition, the $SO_X$ absorbing unit may include a multi-stage seawater spray nozzle that is connected to the control valve and sprays seawater downward.

In addition, porous upper plates having a passage through which exhaust gas passes may be respectively formed in multi-stages under the seawater spray nozzle, so that the seawater and the exhaust gas come into contact with each other.

In addition, an absorption apparatus filled with a third packing material for allowing seawater and exhaust gas to come into contact with each other may be respectively formed under the seawater spray nozzle, so that the seawater dissolves $SO_X$.

In addition, the $SO_X$ absorbing unit may include an umbrella-shaped partition wall that covers an exhaust gas inlet pipe so as to prevent cleaning water from flowing backward.

In addition, the $CO_2$ removing unit may include: an ammonia water spray nozzle that is connected to the ammonia water pump and sprays ammonia water downward; a second packing material that contacts $CO_2$ with the ammonia water and converts $CO_2$ into $NH_4HCO_3(aq)$; a cooling jacket that is formed in multi-stages for each section of an absorption apparatus filled with the second packing material and cools heat generated by a $CO_2$ removal reaction; a water spray that collects $NH_3$ discharged to the outside without reacting with $CO_2$; a mist removal plate that is formed in a curved multi-plate shape and returns the ammonia water toward the second packing material; a partition wall that is formed so that the ammonia water does not flow backward; and an umbrella-shaped blocking plate that covers an exhaust gas inlet hole of the partition wall.

In addition, the absorption tower may further include an exhaust gas economizer (EGE) that is formed between the $NO_X$ absorbing unit and the $SO_X$ absorbing unit and performs heat exchange between waste heat of the vessel engine and boiler water.

In addition, the apparatus may further include a steam generating unit including: an auxiliary boiler that receives a mixture in the form of saturated water and heat-exchanged steam, separates the steam, and supplies the separated steam to a steam consumer; a boiler water circulating pump that circulates and supplies boiler water from the auxiliary boiler to the EGE; a cascade tank that recovers condensed water from the steam consumer; and a supply pump and a control valve that supply boiler water from the cascade tank to the auxiliary boiler while controlling an amount of boiler water.

In addition, the ammonia recycling unit may include: a $Ca(OH)_2$ storage tank that stores $Ca(OH)_2$; a mixing tank in which $NH_4HCO_3(aq)$ discharged from the absorption tower is stirred with $Ca(OH)_2$ by an agitator to generate $CaCO_3(s)$ and $H_2O$ and $NH_3(g)$ is recycled; a filter that suctions a solution and precipitate from the mixing tank and separates $CaCO_3(s)$; a high-pressure pump that transfers the solution and precipitate to the filter at high pressure; and a $CaCO_3(s)$ storage tank that stores a slurry or $CaCO_3(s)$ of a solid state.

In addition, the ammonia recycling unit may include: a $Mg(OH)_2$ storage tank that stores $Mg(OH)_2$; a mixing tank in which $NH_4HCO_3(aq)$ discharged from the absorption tower is stirred with $Mg(OH)_2$ by an agitator to generate $MgCO_3(s)$ and $H_2O$ and $NH_3(g)$ is recycled; a filter that suctions a solution and precipitate from the mixing tank and separates $MgCO_3(s)$; a high-pressure pump that transfers the solution and precipitate to the filter at high pressure; and a $MgCO_3(s)$ storage tank that stores a slurry or $MgCO_3(s)$ of a solid state.

In addition, ammonia water or fresh water separated by the filter may be supplied to the ammonia water producing unit, or excess ammonia water or excess fresh water additionally generated by the mixing tank compared to a total circulating fresh water may be stored in the fresh water tank.

In addition, the fresh water supplied from the fresh water tank may be reacted with CaO to produce $Ca(OH)_2$ in the $Ca(OH)_2$ storage tank.

In addition, the fresh water supplied from the fresh water tank may be reacted with MgO to produce $Mg(OH)_2$ in the $Mg(OH)_2$ storage tank.

In addition, the apparatus may further include a discharge unit including: a cleaning water tank that stores cleaning water discharged from the absorption tower; a water treatment device including a filtering unit that controls turbidity to satisfy an outboard discharge condition of the cleaning water transferred to the cleaning water tank by a transfer pump, and a neutralizing agent injecting unit that controls pH; and a sludge storage tank that separates and stores solid emissions.

On the other hand, the present invention may provide a vessel including the above-described apparatus.

Advantageous Effects of the Invention

According to the present invention, $NO_X$, $SO_X$, and $CO_2$ from exhaust gas exhausted from a vessel engine may be converted into materials that do not affect environments so as to satisfy IMO greenhouse gas emission regulations. The materials may be separately discharged, or may be converted into useful materials and stored. Since $CO_2$ is removed after $SO_X$ is removed, the $CO_2$ dissolution reaction rate, the $CO_2$ solubility, and the $CO_2$ removal efficiency may be increased. The use of $Ca(OH)_2$ or $Mg(OH)_2$ may reduce the $NH_3$ recycling cost. The capacity size of the rear end part of the filter may be reduced. When $CO_2$ is removed, only relatively inexpensive $NH_3$ loss and $Ca(OH)_2$ or $Mg(OH)_2$ (CaO or MgO) are consumed, reducing removal costs. Side reactions caused by $SO_X$ remaining during $NH_3$ recycling may be removed, thereby minimizing the loss of $NH_3$ and preventing impurities from being included when recovering ammonia. By adding only $Ca(OH)_2$ or $Mg(OH)_2$, there is no change in the concentration of ammonia water, and the capacity size of the filter may be reduced.

DETAILED DESCRIPTION OF THE INVENTION

Hereinafter, embodiments of the present invention will be described in detail with reference to the accompanying drawings so that the present invention can be easily carried out by those of ordinary skill in the art. The present invention may be embodied in many different forms and is not limited to embodiments of the present invention described herein.

An apparatus for reducing greenhouse gas emission in a vessel, according to an embodiment of the present invention, includes: a seawater supply unit that supplies seawater; an ammonia water producing unit that reacts fresh water with $NH_3$ to produce and supply ammonia water; an absorption tower including a $CO_2$ removing unit that cools exhaust gas discharged from a vessel engine by reacting the exhaust gas with the seawater supplied from the seawater supply unit, and removes $CO_2$ by reacting the cooled exhaust gas with the ammonia water supplied from the ammonia water producing unit to convert $CO_2$ into $NH_4HCO_3(aq)$; and an ammonia recycling unit that recycles $NH_3$ by reacting $NH_4HCO_3(aq)$ discharged from the absorption tower with $Ca(OH)_2$ or $Mg(OH)_2$, and returns the recycled $NH_3$ back to the ammonia water producing unit.

At this time, according to the type and specification of the engine (low-pressure engine or high-pressure engine) and the type of fuel supplied to the engine (HFO, MDO, MGO, LNG, ammonia, etc.), the absorption tower may optionally include both the $NO_X$ absorbing unit and the $SO_X$ absorbing.

In particular, with respect to the $SO_X$ absorbing unit, as described later, since $SO_X$ may be dissolved by reacting with seawater, cooling of exhaust gas and absorption of $SO_X$ may be performed at once.

On the other hand, according to another embodiment of the present invention, a vessel including the apparatus for reducing greenhouse gas emission may be provided.

Hereinafter, an embodiment in which the $NO_X$ absorbing unit, the $SO_X$ absorbing unit, and the $CO_2$ removing unit are stacked on the absorption tower will be described, but the present invention is not limited thereto. As described above, the $NO_X$ absorbing unit and/or the $SO_X$ absorbing unit may or may not be included according to the types of engine and fuel.

An apparatus for reducing greenhouse gas emission in a vessel, according to an embodiment of the present invention, includes: a seawater supply unit 110 that supplies seawater; an ammonia water producing unit 120 that reacts fresh water with $NH_3$ to produce and supply ammonia water; an absorption tower 130 including a $CO_2$ removing unit 133 that cools exhaust gas discharged from a vessel engine 10 by reacting the exhaust gas with the seawater supplied from the seawater supply unit 110, and removes $CO_2$ by reacting the cooled exhaust gas with the ammonia water supplied from the ammonia water producing unit 120 to convert $CO_2$ into $NH_4HCO_3(aq)$; and an ammonia recycling unit 140 that recycles $NH_3$ by reacting $NH_4HCO_3(aq)$ discharged from the absorption tower 130 with $Ca(OH)_2$ or $Mg(OH)_2$, and returns the recycled $NH_3$ back to the ammonia water producing unit 120. It is possible to satisfy IMO greenhouse gas emission regulations by separating and discharging $NO_X$, $SO_X$, and $CO_2$ from exhaust gas, increase $CO_2$ removal efficiency by removing $CO_2$ after removing $SO_X$, and removing side reactions caused by $SO_X$ remaining during $NH_3$ removal, thereby preventing impurities from being included during ammonia recovery.

Hereinafter, the apparatus for reducing greenhouse gas emission in the vessel will be described in detail with reference to FIGS. 1 to 9.

Figure 1:
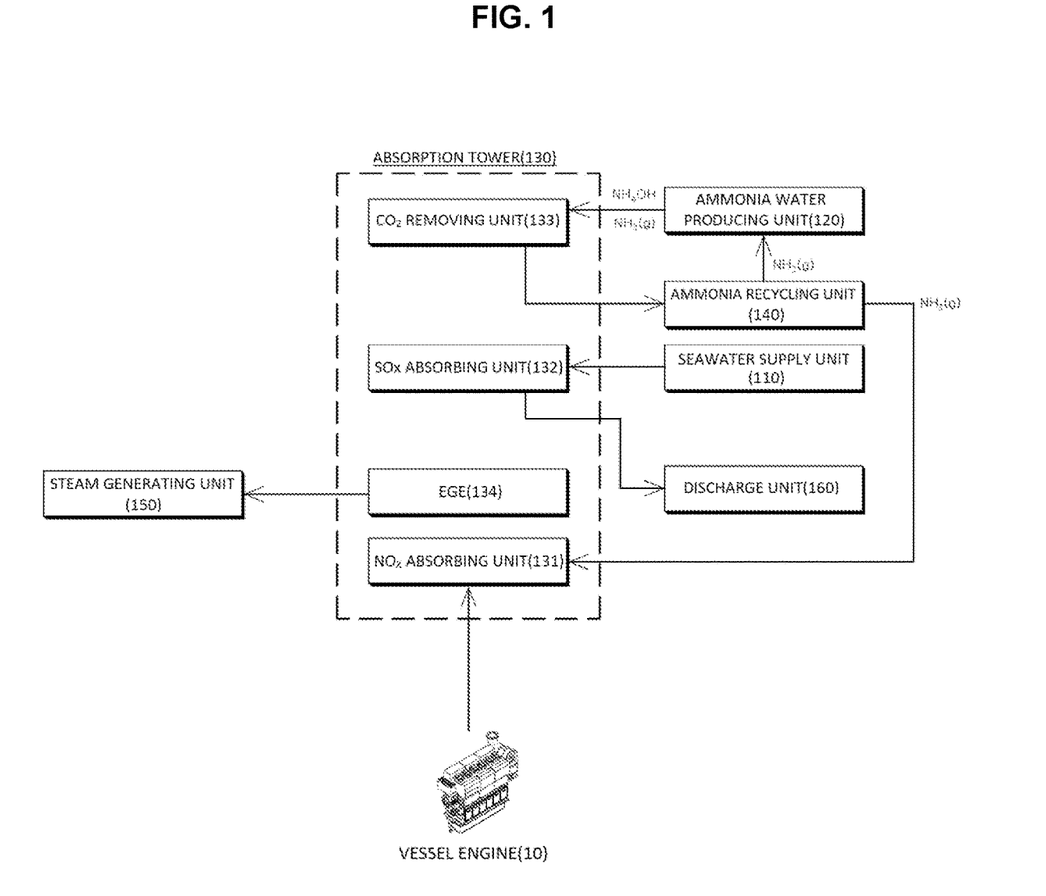
FIG. 1 is a schematic configuration diagram of an apparatus for reducing greenhouse gas emission in a vessel, according to an embodiment of the present invention.
Figure 2:
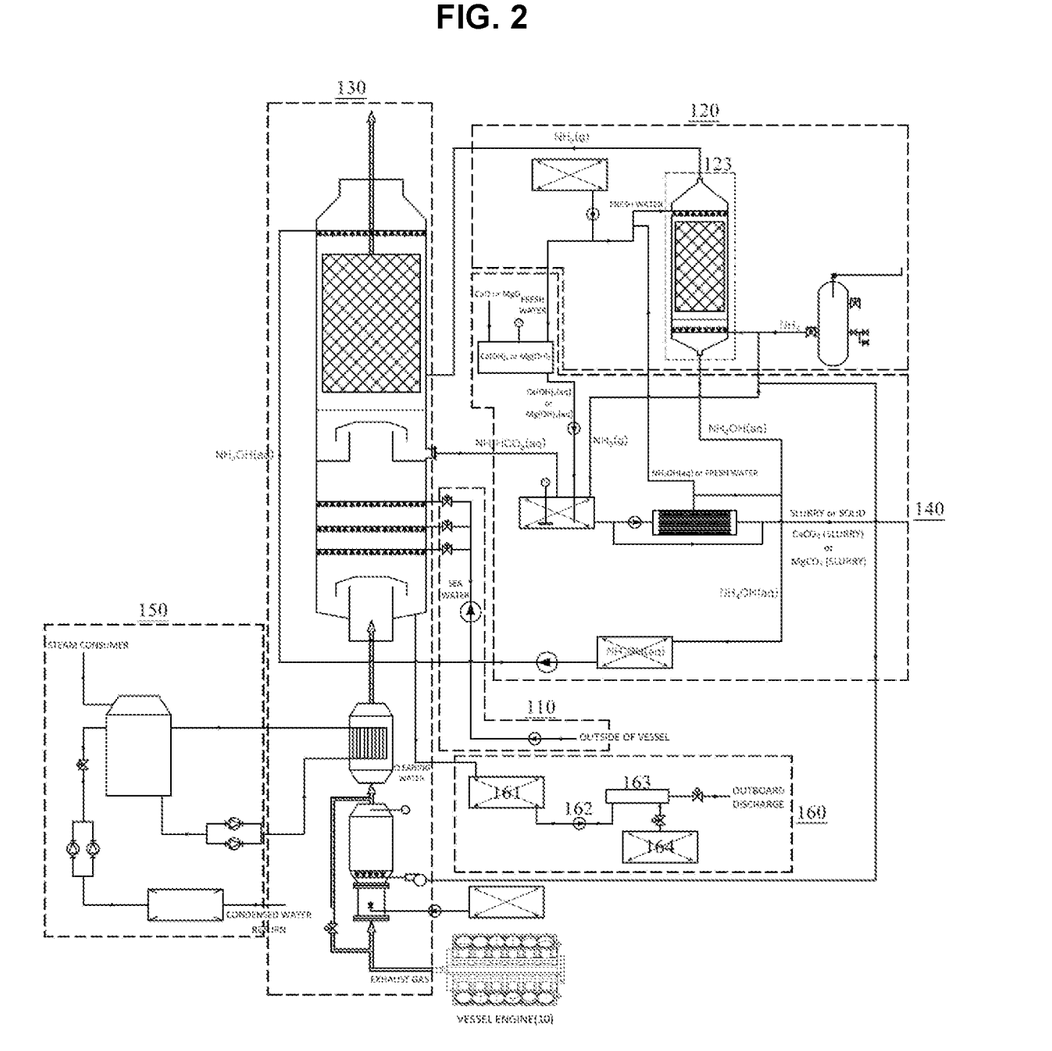
FIG. 2 is a circuit diagram of a system implementing the apparatus for reducing greenhouse gas emission in a vessel, illustrated in FIG. 1.
Figure 3:
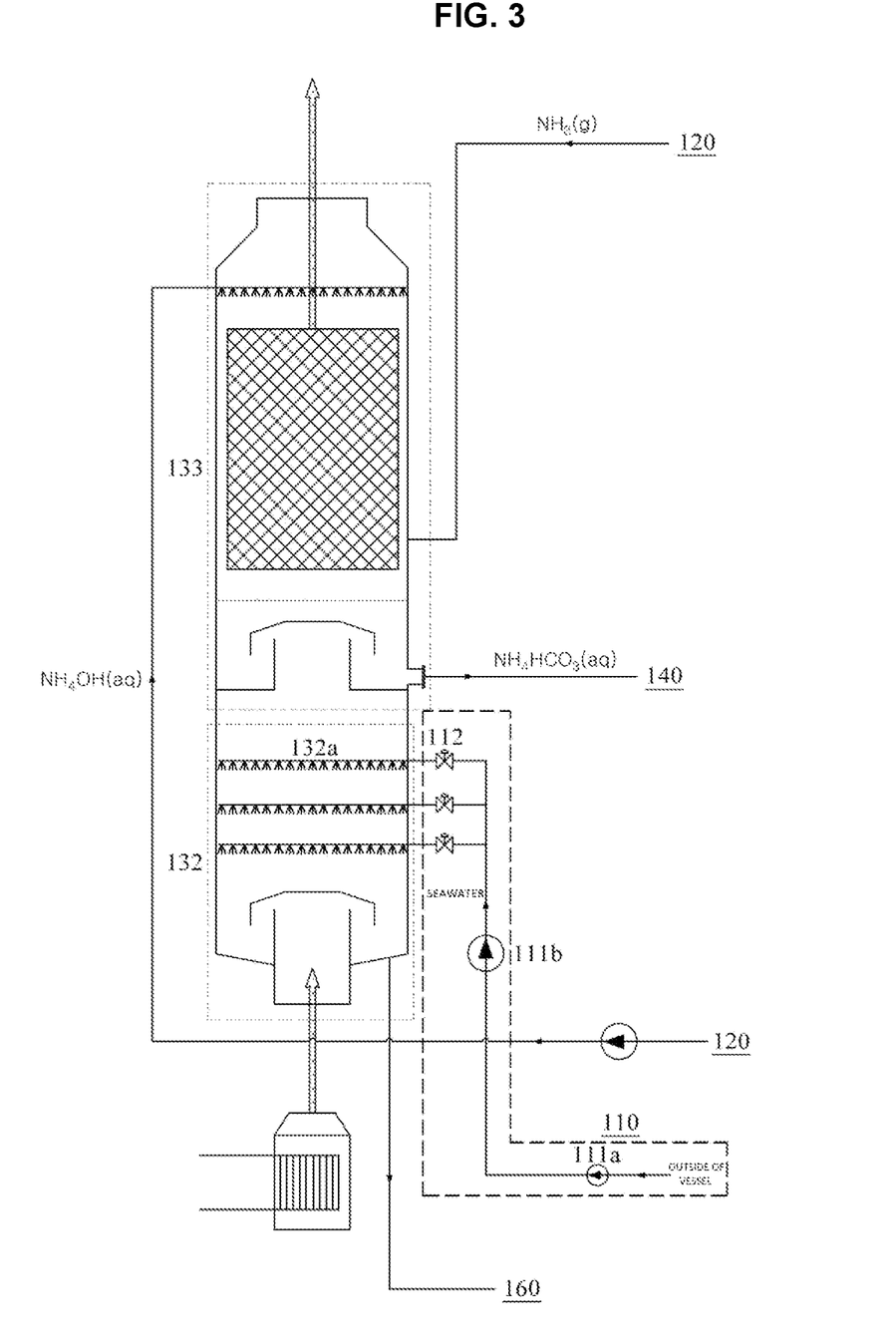
FIG. 3 separately illustrates a seawater supply unit of the apparatus for reducing greenhouse gas emission in a vessel, illustrated in FIG. 2.

First, a seawater supply unit 110 supplies seawater to a $SO_X$ absorbing unit 132 of an absorption tower 130. Specifically, as illustrated in FIGS. 2 and 3, the seawater supply unit 110 may include: seawater pumps 111a and 111b that suction seawater from the outside of the vessel through a sea chest (not illustrated) and pump the seawater to the $SO_X$ absorbing unit 132; and a control valve 112 that controls a flow rate of the seawater supplied from the seawater pumps 111a and 111b according to the amount of exhaust gas. Here, the seawater pumps 111a and 111b may include a suction pump 111a that suctions seawater from the outside of the vessel and a seawater transfer pump 111b that pumps and transfers seawater to the $SO_X$ absorbing unit 132.

For reference, when the vessel is berthing or sailing, seawater may be selectively supplied to the seawater pumps 111a and 111b from a high sea chest that suctions upper seawater or a low sea chest that suctions lower seawater according to the depth of water. That is, when the vessel is berthing, the high sea chest may be used because the upper seawater is cleaner than the lower seawater, and when the vessel is sailing, the low sea chest may be used because the lower seawater is cleaner than the upper seawater.

Here, the control valve 112 may be a manually operated diaphragm valve or a solenoid type valve that controls the flow rate of seawater, but the present invention is not limited thereto. Any type of valve may be applied as long as the amount of seawater injected through a seawater spray nozzle 132a can be controlled according to the amount of exhaust gas.

Figure 4:
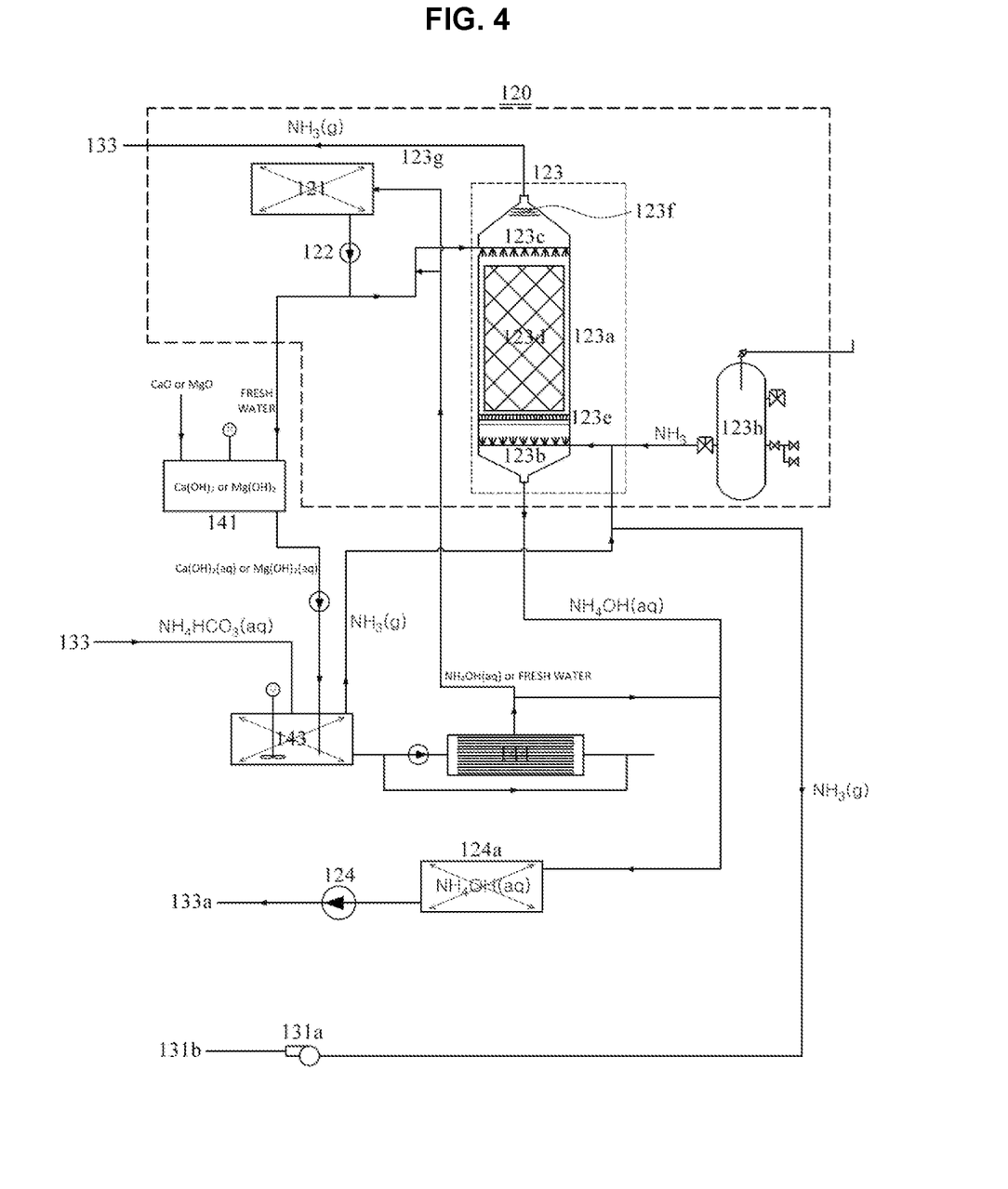
FIG. 4 separately illustrates an ammonia water producing unit of the apparatus for reducing greenhouse gas emission in a vessel, illustrated in FIG. 2.

Next, an ammonia water producing unit 120 reacts fresh water with $NH_3$ recycled or replenished when insufficient to produce and supply ammonia water ($NH_4OH(aq)$).

Specifically, as illustrated in FIGS. 2 and 4, the ammonia water producing unit 120 may include: a fresh water tank 121 that stores fresh water; a fresh water pump 122 that pumps and supplies the fresh water from the fresh water tank 121; an ammonia water production tower 123 including a tower tank 123a, a $NH_3$ spray nozzle 123b that is formed at a lower end of the tower tank 123a and sprays $NH_3$ upward, a fresh water spray nozzle 123c that is formed at an upper end of the tower tank 123a and sprays the fresh water from the fresh water pump 122 downward, a packing material 123d that is formed between the $NH_3$ spray nozzle 123b and the fresh water spray nozzle 123c and contacts the fresh water with $NH_3$ to dissolve $NH_3$ and generate ammonia water, and a cooling jacket 123e that cools heat generated by the tower tank 123a due to the dissolution reaction based on the following [Chemical Formula 1]; and an ammonia water pump 124 that supplies ammonia water from an ammonia water storage tank 124a, which stores the ammonia water drained to a lower end of the ammonia water production tower 123, to an ammonia water spray nozzle 133a, which is formed at an upper end of a $CO_2$ removing unit 133.

$NH_3+H_2O \rightarrow NH_4OH(aq)$, (exothermic reaction, 1650 MJ/ton)     [Chemical Formula 1]

Figure 8:
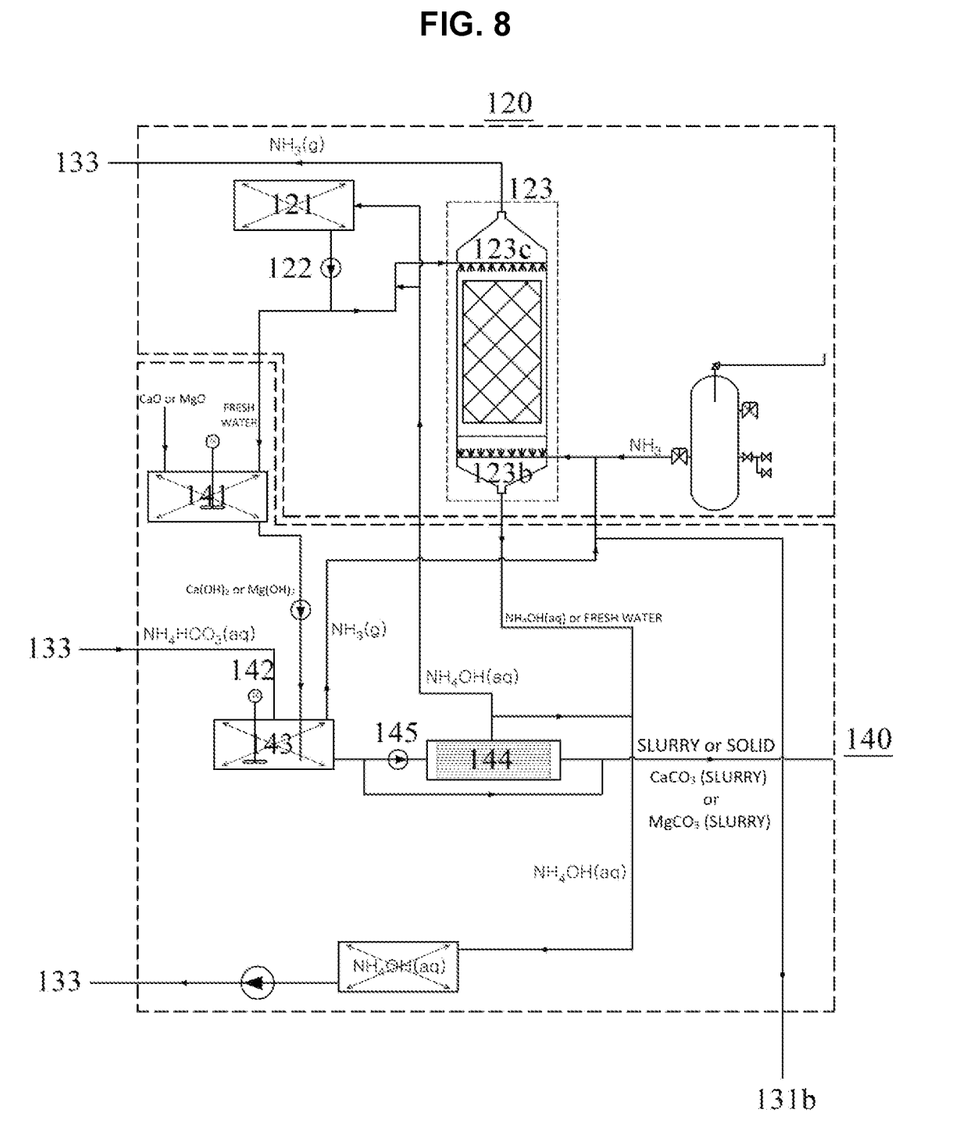
FIG. 8 separately illustrates an ammonia recycling unit and an ammonia water producing unit of the apparatus for reducing greenhouse gas emission in a vessel, illustrated in FIG. 2.

Here, the fresh water tank 121 may store distilled water produced on board or fresh water (or ammonia water) separated when $CaCO_3$ or $MgCO_3$ is separated by a filter 144 and transferred to the ammonia water production tower 123, that is, surplus fresh water additionally produced through a mixing tank 143 and the filter 144 compared to the total circulating fresh water required for ammonia water production and $NH_3$ recycling (see FIG. 8).

On the other hand, referring to FIG. 4, the ammonia water production tower 123 may further include a mist removal plate 123f that is formed at an upper end of the fresh water spray nozzle 123c disposed at the upper end of the tower tank 123a in a curved multi-plate shape and returns mist scattered from the fresh water toward the packing material 123d. Since the fresh water may be discharged to the outside through the exhaust gas, the mist may collide with the curved portion so that droplets become larger, and the water may be discharged toward the lower packing material 123d.

In addition, the ammonia water production tower 123 may further include a $NH_3$ supply pipe 123g through which $NH_3(g)$ exhausted to the upper end of the ammonia water production tower 123 is supplied to the lower end of the $CO_2$ removing unit 133. Excess $NH_3(g)$ that is not dissolved and exhausted is absorbed into the ammonia water flowing down through the $CO_2$ removing unit 133, thereby minimizing the loss of $NH_3$.

On the other hand, when the lack of $NH_3$ occurs or the loss of $NH_3$ itself occurs because the amount of $NH_3$ recycled by the ammonia recycling unit 140 is insufficient to produce ammonia water by the ammonia water production tower 123 or supply $NH_3$ to a first $NH_3$ spray nozzle 131b of a $NO_X$ absorbing unit 131, a separate $NH_3$ storage tank 123h may be provided to supply $NH_3$ so as to compensate for the loss and lack of $NH_3$. That is, $NH_3$ may be directly supplied from the ammonia recycling unit 140 to the $NH_3$ spray nozzle 123b of the ammonia water producing unit 120, or $NH_3$ may be directly supplied to the first $NH_3$ spray nozzle 131b of the $NO_X$ absorbing unit 131 through a blower 131a or a compressor, or $NH_3$ may be supplied from the $NH_3$ storage tank 123h in the event of the loss or lack of $NH_3$, thereby replacing the loss or lack of $NH_3$.

In addition, the diameter and height of the tower tank 123a are preferably designed so that the flow velocity of fresh water and the flow velocity of $NH_3$ are ½ of the flooding velocity. In this manner, in a state where $NH_3$ is sprayed at a pressure slightly higher than atmospheric pressure through the $NH_3$ spray nozzle 123b, the pressure drop may be offset in the wet state of the tower tank 123a.

Figure 9:
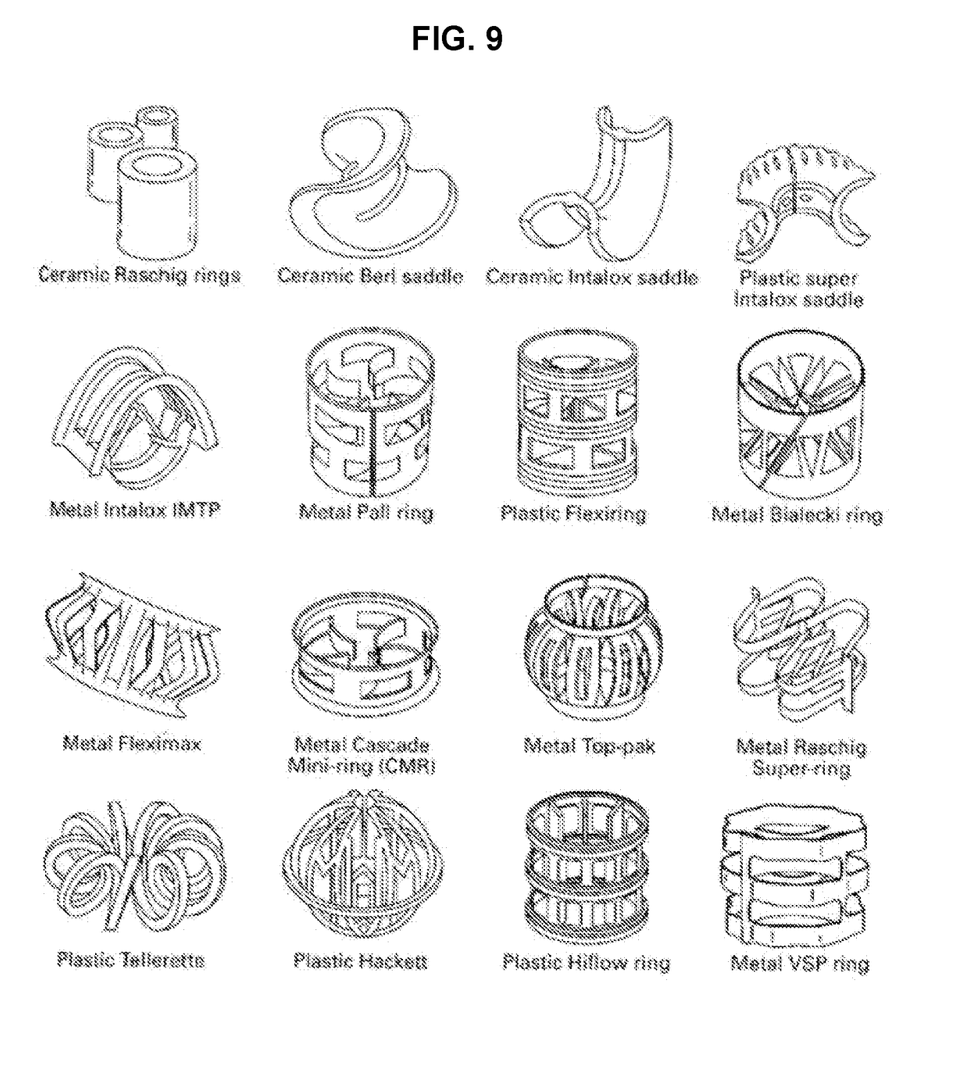
FIG. 9 illustrates various packing materials applied to the apparatus for reducing greenhouse gas emission in a vessel, illustrated in FIG. 2.

In addition, the packing material 123d may include multi-stage distilling column packings designed to increase a contact area per unit volume. As illustrated in FIG. 9, a distilling column packing suitable for a process may be selected considering the contact area per unit area, the pressure drop of gas, and the flooding velocity.

On the other hand, a solution redistributor (not illustrated) may be formed between the multi-stage distilling column packings so as to prevent channeling of fresh water.

In addition, the ammonia water pump 124 may be provided with a centrifugal pump, so that a large amount of ammonia water is pumped and effectively supplied from the ammonia water production tower 123 to the $CO_2$ removing unit 133.

In addition, the cooling jacket 123e may be cooled so that the reaction temperature of the dissolution reaction is maintained at 30° C. to 50° C., considering the solubility of $NH_3$.

Figure 5:
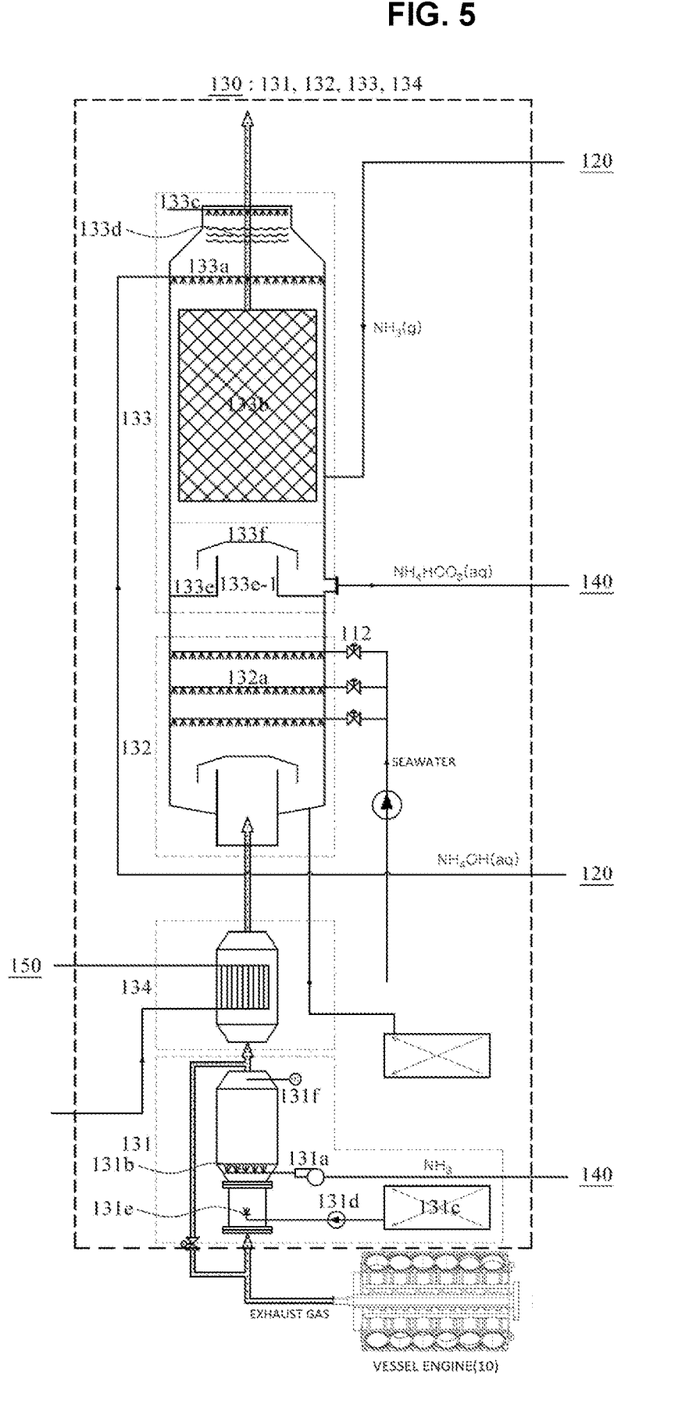
FIG. 5 separately illustrates an absorption tower of the apparatus for reducing greenhouse gas emission in a vessel, illustrated in FIG. 2.
Figure 6:
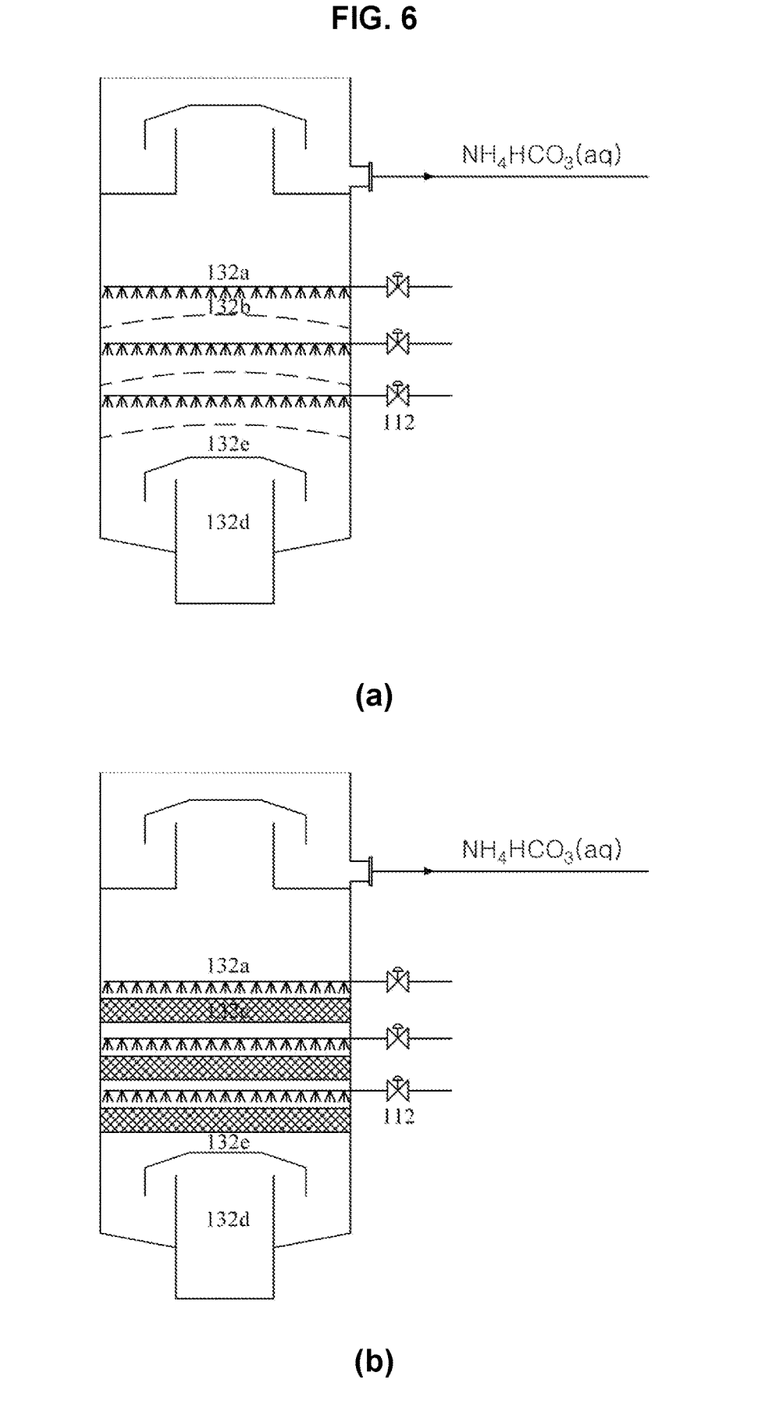
FIG. 6 separately illustrates a $SO_X$ absorbing unit of the absorption tower of FIG. 5.

Next, as illustrated in FIGS. 2 and 5, in the absorption tower 130, a $NO_X$ absorbing unit 131 that absorbs and removes $NO_X$ from exhaust gas discharged from the vessel engine 10 of the main engine or power generation engine, a $SO_X$ absorbing unit 132 that dissolves and removes $SO_X$ while cooling exhaust gas, from which $NO_X$ has been removed, through reaction with seawater, and a $CO_2$ removing unit 133 that removes $CO_2$ by reacting the exhaust gas, from which $SO_X$ has been removed, with the ammonia water supplied from the ammonia water producing unit 120 to convert $CO_2$ into $NH_4HCO_3(aq)$ are stacked in the vertical direction to sequentially absorb and remove $NO_X$, $SO_X$, and $CO_2$.

Here, the absorption tower 130 may include the $NO_X$ absorbing unit 131, the $SO_X$ absorbing unit 132, the $CO_2$ removing unit 133, and an exhaust gas economizer (EGE) 134 to be described later, may be modularized and combined with individual modules, and may be integrated in a single tower form, or the absorption tower 130 itself may include a single tower or a plurality of towers.

Specifically, the $NO_X$ absorbing unit 131 is a selective catalyst reactor (SCR). The $NO_X$ absorbing unit 131 may directly receive $NH_3$ from the ammonia recycling unit 140 through the blower 131a or the compressor and spray the received $NH_3$ to the first $NH_3$ spray nozzle 131b, or when $NH_3$ is insufficient, the $NO_X$ absorbing unit 131 may receive urea water of a urea water storage tank 131c through a urea water supply pump 131d and spray the received urea water to a second $NH_3$ spray nozzle 131e so as to compensate for the lack of $NH_3$.

Here, since $NH_3$ and $CO_2$ are generated when the urea water is decomposed, it may be preferable that $NH_3$ is directly supplied to reduce the amount of $CO_2$ generated, and a $NO_N$ sensor 131f (see FIG. 5) that senses $NO_X$ concentration may be formed at the upper end of the $NO_X$ absorbing unit 131.

In addition, the $SO_X$ absorbing unit 132 is a section that is in primary contact with seawater and includes a multi-stage seawater spray nozzle 132a that is connected to the control valve 112 and sprays seawater downward. The $SO_X$ absorbing unit 132 may dissolve $SO_X$, remove dusts such as soot, and cool the temperature of the exhaust gas to 27° C. to 33° C., preferably about 30° C., which is required by the $CO_2$ removing unit 133, through the seawater spray nozzle 132a or a separate cooling jacket (not illustrated).

On the other hand, as illustrated in FIG. 6(a), porous upper plates 132b having a passage through which exhaust gas passes may be respectively formed in multi-stages under the seawater spray nozzle 132a, so that the seawater and the exhaust gas come into smooth contact with each other. As illustrated in FIG. 6(b), an absorption apparatus 132c filled with a packing material for allowing seawater and exhaust gas to come into contact with each other may be respectively formed under the seawater spray nozzle 132a, so that the seawater dissolves $SO_X$.

On the other hand, a closed loop system may be applied to add a compound forming alkali ions, for example, a basic chemical of NaOH or MgO, in order to further increase the solubility of $SO_X$.

For reference, the closed loop system involves additional consumption of basic chemicals, but has an advantage that the amount of circulating seawater is small, and the open loop system that discharges $SO_X$ dissolved by spraying only seawater to the outside of the vessel has no additional consumption of basic chemicals and is simple. In order to maximize these advantages, a hybrid system in which the open loop system and the closed loop system are combined may be applied.

In this regard, by removing $SO_X$ through the $SO_X$ absorbing unit 132 and then removing $CO_2$ through the $CO_2$ removing unit 133, it is possible to solve the problem that it is difficult to remove $CO_2$ until $SO_X$ is completely dissolved because the solubility of $SO_X$ is high and thus $SO_X$ is first changed to a compound such as $NaSO_3$, thereby improving the solubility of $CO_2$ and the removal efficiency of $CO_2$.

Here, cleaning water drained from a discharge unit 160 by the $SO_X$ absorbing unit 132 contains $SO_3^-$, $SO_4^{2-}$, soot, $NaSO_3$, $NaSO_4$, $MgCO_3$, $MgSO_4$, and other ionic compounds together, and the $SO_X$ absorbing unit 132 may include an umbrella-shaped partition wall 132e that covers an exhaust gas inlet pipe 132d so that the cleaning water does not flow back to the $NO_X$ absorbing unit 131 or the EGE 134.

In addition, as illustrated in FIGS. 4 and 5, the $CO_2$ removing unit 133 may include: an ammonia water spray nozzle 133a that is connected to the ammonia water pump 124 and sprays ammonia water downward; a packing material 133b that contacts $CO_2$ with the ammonia water and converts $CO_2$ into $NH_4HCO_3(aq)$ based on the following [Chemical Formula 2]; a cooling jacket (not illustrated) that is formed in multi-stages for each section of the absorption apparatus filled with the packing material 133b and cools heat generated by a $CO_2$ removal reaction to maintain the heat at 30° C. to 50° C.; a water spray 133c that collects $NH_3$ discharged to the outside without reacting with $CO_2$; a mist removal plate 133d that is formed in a curved multi-plate shape and returns the ammonia water to the packing material 133b; a partition wall 133e that is formed so that the ammonia water does not flow back to the $SO_X$ absorbing unit 132; and an umbrella-shaped blocking plate 133f that covers an exhaust gas inlet hole 133e-1 of the partition wall 133e.

$$2NH_4OH+CO_2 \rightarrow (NH_4)_2CO_3+H_2O$$

$$(NH_4)_2CO_3+CO_2+H_2O \rightarrow 2NH_4HCO_3 \quad \text{[Chemical Formula 2]}$$

Here, since the $CO_2$ removing unit 133 removes $CO_2$ by reacting the ammonia water with the exhaust gas from which $NO_X$ and $SO_X$ have been removed, side reactions caused by $NO_X$ and $SO_X$ do not occur during the $CO_2$ removal process, thereby minimizing the occurrence of impurities and obtaining $NH_4HCO$ with less impurities in a subsequent process.

In addition, the packing material 133b may include multi-stage distilling column packings designed to increase a contact area per unit volume. As illustrated in FIG. 9, a distilling column packing suitable for a process may be selected considering the contact area per unit area, the pressure drop of gas, and the flooding velocity.

On the other hand, the absorption tower 130 may further include an EGE 134 that is formed between the $NO_X$ absorbing unit 131 and the $SO_X$ absorbing unit 132 and performs heat exchange between waste heat of the vessel engine 10 and boiler water.

Next, the ammonia recycling unit 140 reacts $NH_4HCO_3$ (aq) discharged from the absorption tower 130 with $Ca(OH)_2$ or $Mg(OH)_2$ to recycle $NH_3$, returns $NH_3$ back to the ammonia water producing unit 120 and the $NO_X$ absorbing unit 131 so as to reuse $NH_3$, and stores or discharges $CO_2$ in the form of $CaCO_3(s)$ or $MgCO_3(s)$.

Specifically, as illustrated in FIGS. 2 and 8, the ammonia recycling unit 140 may include: a $Ca(OH)_2$ storage tank 141 or a $Mg(OH)_2$ storage tank 141 that stores $Ca(OH)_2$ or $Mg(OH)_2$; a mixing tank 143 in which $NH_4HCO_3(aq)$ discharged from the $CO_2$ removing unit 133 of the absorption tower 130 is stirred with $Ca(OH)_2$ or $Mg(OH)_2$ by an agitator 142 to generate $CaCO_3(s)$ or $MgCO_3(s)$ and $H_2O$ based on the following [Chemical Formula 3] or [Chemical Formula 4] and $NH_3(g)$ is recycled; a filter 144 that suctions a solution and precipitate from the mixing tank 143 and separates $CaCO_3(s)$ or $MgCO_3(s)$; a high-pressure pump 145 that transfers the solution and precipitate to the filter 144 at high pressure; and a CaCO₃(s) storage tank (not illustrated) or a MgCO₃(s) storage tank (not illustrated) that stores a slurry or CaCO₃(s) or MgCO₃(s) of a solid state transferred to a dryer (not illustrated) and solidified.

[Chemical Formula 3]

[Chemical Formula 4]

Here, $NH_4HCO_3(aq)$ and $Ca(OH)_2$ or $Mg(OH)_2$ are continuously reacted by the agitator 142 installed in the mixing tank 143, while maintaining at a constant temperature so that the reaction is smoothly performed.

On the other hand, the waste of fresh water may be eliminated by supplying fresh water (or ammonia water) separated by the filter 144 to the fresh water spray nozzle 123c of the ammonia water producing unit 120, or storing, in the fresh water tank 121, excess fresh water (or excess ammonia water) additionally generated by the mixing tank 143 compared to the total circulating fresh water required for ammonia water production and $NH_3$ recycling.

In addition, the $Ca(OH)_2$ storage tank 141 or the $Mg(OH)_2$ storage tank 141 may react the fresh water supplied from the fresh water tank 121 with CaO or MgO to generate $Ca(OH)_2$ or $Mg(OH)_2$, store $Ca(OH)_2$ or $Mg(OH)_2$, and supply $Ca(OH)_2$ or $Mg(OH)_2$ to the mixing tank 143. Here, since the solubility of CaO or MgO is low, it is effective to apply a method of preparing $Ca(OH)_2(aq)$ or $Mg(OH)_2(aq)$ by adding CaO or MgO to fresh water as necessary. When adding CaO or MgO, heating and stirring have to be accompanied.

In this manner, there is no reduction in the concentration of ammonia water, the capacity size of the filter 144 may be reduced, and the $NH_3$ recycling cost may be reduced. That is, in theory, only MgO is consumed and $NH_3$ and fresh water are reused, thereby significantly reducing the $CO_2$ removal cost.

In addition, the filter 144 suctions the solution and precipitate from the mixing tank 143, transfers $NaHCO_3$ and other by-product precipitates at high pressure by the high-pressure pump 145, separates $CaCO_3$ or $MgCO_3$, and stores $CaCO_3$ or $MgCO_3$ in a solid state or discharges $CaCO_3$ or $MgCO_3$ to the outside of the vessel. Here, as an example of the filter, a membrane filter suitable for precipitate separation by high-pressure fluid transfer may be applied.

In addition, the $NH_3$ recycled by the mixing tank 143 is supplied to the $NH_3$ spray nozzle 123b of the ammonia water producing unit 120 and the first $NH_3$ spray nozzle 131b of the $NO_X$ absorbing unit 131 so as to be reused for ammonia water production and $NO_X$ removal, thereby minimizing the consumption of relatively expensive $NH_3$ and reducing costs.

Figure 7:
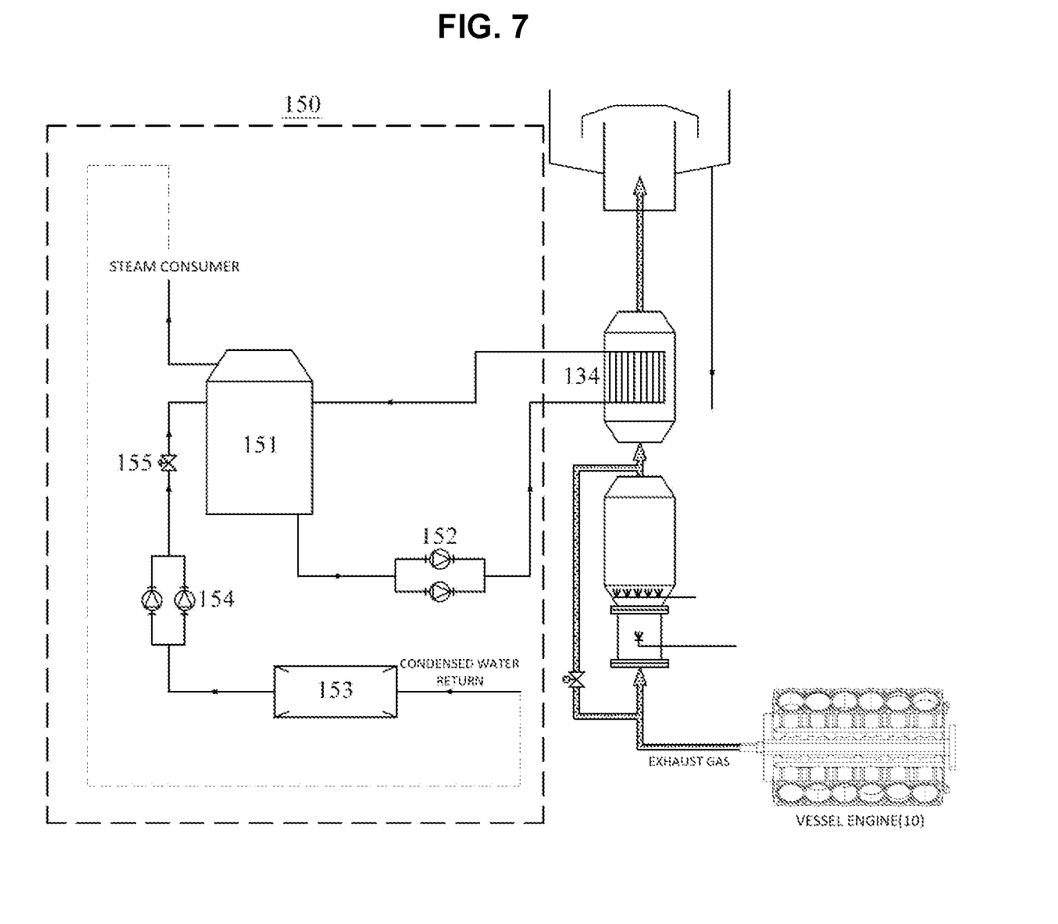
FIG. 7 separately illustrates a steam generating unit of the apparatus for reducing greenhouse gas emission in a vessel, illustrated in FIG. 2.

Next, as illustrated in FIG. 7, the steam generating unit 150 may include: an auxiliary boiler 151 that receives a mixture in the form of saturated water and steam heat-exchanged through the EGE 134, separates the steam by a steam drum (not illustrated), and supplies the separated steam to a steam consumer; a boiler water circulating pump 152 that circulates and supplies boiler water from the auxiliary boiler 151 to the EGE 134; a cascade tank 153 that recovers condensed water condensed and phase-changed after being consumed from the steam consumer; and a supply pump 154 and a control valve 155 that supply boiler water from the cascade tank 153 to the auxiliary boiler 151 while controlling the amount of boiler water. The steam generating unit 150 generates and supplies steam required for heating devices in the vessel.

Here, when the load of the vessel engine 10 is large, the amount of heat that may be provided from the exhaust gas is large, and thus the amount of steam required in the vessel may be sufficiently produced through the EGE 134; otherwise, the auxiliary boiler 151 itself may burn fuel to produce necessary steam.

Next, as illustrated in FIG. 2, the discharge unit 160 may include: a cleaning water tank 161 that stores cleaning water discharged from the absorption tower 130; a water treatment device 163 including a filtering unit that controls turbidity to satisfy the outboard discharge condition of the cleaning water transferred to the cleaning water tank 161 by the transfer pump 162, and a neutralizing agent injecting unit that controls pH; and a sludge storage tank 164 that separates and stores solid emissions such as soot. The discharge unit 160 may discharge the cleaning water, which passes through the water treatment device 163 and satisfies the outboard discharge condition, to the outside of the vessel, and may separately store the solid emissions, such as soot, which do not satisfy the outboard discharge conditions, in the sludge storage tank 164.

On the other hand, NaOH may be used as the neutralizing agent for satisfying the outboard discharge condition. However, assuming that the materials discharged from the absorption tower 130 are acidic and basic, a neutralizing agent capable of neutralizing each of the acidic material and the basic material may be selected and used as necessary.

Therefore, as described above, according to the structure of the apparatus for reducing greenhouse gas emission in the vessel, $NO_X$, $SO_X$, and $CO_2$ from the exhaust gas exhausted from the vessel engine may be converted into materials that do not affect environments so as to satisfy IMO greenhouse gas emission regulations. The materials may be separately discharged, or may be converted into useful materials and stored. Since $CO_2$ is removed after $SO_X$ is removed, the $CO_2$ dissolution reaction rate, the $CO_2$ solubility, and the $CO_2$ removal efficiency may be increased. The use of $Ca(OH)_2$ or $Mg(OH)_2$ may reduce the $NH_3$ recycling cost. The capacity size of the rear end part of the filter may be reduced. When $CO_2$ is removed, only relatively inexpensive $NH_3$ loss and $Ca(OH)_2$ or $Mg(OH)_2$ (CaO or MgO) are consumed, reducing removal costs. $CO_2$ may be stored in the form of $CaCO_3(s)$ or $MgCO_3(s)$ existing in the nature. $CaCO_3(s)$ or $MgCO_3(s)$ may be discharged in sea, and side reactions caused by $SO_X$ remaining during $NH_3$ recycling may be removed, thereby minimizing the loss of $NH_3$ and preventing impurities from being included when recovering ammonia. Since only $Ca(OH)_2$ or $Mg(OH)_2$ is added, there is no change in the concentration of ammonia water, and the capacity size of the filter may be reduced.

The present invention has been described above with reference to the embodiments illustrated in the drawings. However, the present invention is not limited thereto, and various modifications or other embodiments falling within the scope equivalent to the present invention can be made by those of ordinary skill in the art. Therefore, the true scope of protection of the present invention should be determined by the appended claims.

What is claimed is:

1. An apparatus for reducing greenhouse gas emission in a vessel, the apparatus comprising:
   a seawater supply unit that supplies seawater;
   an ammonia water producing unit that reacts fresh water with $NH_3$ to produce and supply ammonia water;
   an absorption tower comprising a $CO_2$ removing unit that cools exhaust gas discharged from a vessel engine by reacting the exhaust gas with the seawater supplied from the seawater supply unit, and removes $CO_2$ by reacting the cooled exhaust gas with the ammonia water supplied from the ammonia water producing unit to convert $CO_2$ into $NH_4HCO_3$(aq); and an ammonia recycling unit that recycles $NH_3$ by reacting $NH_4HCO_3$(aq) discharged from the absorption tower with $Ca(OH)_2$ or $Mg(OH)_2$, and returns the recycled $NH_3$ back to the ammonia water producing unit.

2. The apparatus according to claim 1, wherein the absorption tower further comprises a $NO_X$ absorbing unit that absorbs and removes $NO_X$ of the exhaust gas discharged from the vessel engine, the $CO_2$ removing unit cools the exhaust gas, from which the $NO_X$ is removed, by reacting the exhaust gas with the seawater supplied from the seawater supply unit, and removes $CO_2$ by reacting the cooled exhaust gas with the ammonia water supplied from the ammonia water producing unit to convert $CO_2$ into $NH_4HCO_3$(aq), and the ammonia recycling unit recycles $NH_3$ and returns the recycled $NH_3$ back to the ammonia water producing unit and the $NO_X$ absorbing unit.

3. The apparatus according to claim 2, wherein the $NO_X$ absorbing unit directly receives $NH_3$ from the ammonia recycling unit through a blower or a compressor and sprays the received $NH_3$ to a first $NH_3$ spray nozzle, or when $NH_3$ is insufficient, the $NO_X$ absorbing unit receives urea water of a urea water storage tank through a urea water supply pump and sprays the received urea water to a second $NH_3$ spray nozzle so as to compensate for the lack of $NH_3$.

4. The apparatus according to claim 1, wherein the absorption tower further comprises a $SO_X$ absorbing unit that dissolves and removes $SO_X$ while cooling the exhaust gas discharged from the vessel engine by reacting the exhaust gas with the seawater supplied from the seawater supply unit, and the $CO_2$ removing unit removes $CO_2$ by reacting the exhaust gas, from which the $SO_X$ is removed, with the ammonia water supplied from the ammonia water producing unit to convert $CO_2$ into $NH_4HCO_3$(aq).

5. The apparatus according to claim 1, wherein, in the absorption tower, a $NO_X$ absorbing unit that absorbs and removes $NO_X$ from the exhaust gas discharged from the vessel engine, a $SO_X$ absorbing unit that dissolves and removes $SO_X$ while cooling the exhaust gas, from which the $NO_X$ has been removed, through reaction with the seawater supplied from the seawater supply unit, and the $CO_2$ removing unit that removes $CO_2$ by reacting the exhaust gas, from which the $SO_X$ has been removed, with the ammonia water supplied from the ammonia water producing unit to convert $CO_2$ into $NH_4HCO_3$(aq) are stacked, and the ammonia recycling unit recycles $NH_3$ and returns the recycled $NH_3$ back to the ammonia water producing unit and the $NO_X$ absorbing unit.

6. The apparatus according to claim 5, wherein the absorption tower further comprises an exhaust gas economizer (EGE) that is formed between the $NO_X$ absorbing unit and the $SO_X$ absorbing unit and performs heat exchange between waste heat of the vessel engine and boiler water.

7. The apparatus according to claim 5, wherein the $NO_X$ absorbing unit directly receives $NH_3$ from the ammonia recycling unit through a blower or a compressor and sprays the received $NH_3$ to a first $NH_3$ spray nozzle, or when $NH_3$ is insufficient, the $NO_X$ absorbing unit receives urea water of a urea water storage tank through a urea water supply pump and sprays the received urea water to a second $NH_3$ spray nozzle so as to compensate for the lack of $NH_3$.

8. The apparatus according to claim 1, wherein the ammonia water producing unit comprises:

a fresh water tank that stores fresh water;

a fresh water pump that pumps and supplies the fresh water from the fresh water tank;

an ammonia water production tower comprising a tower tank, a $NH_3$ spray nozzle that is formed at a lower end of the tower tank and sprays $NH_3$ upward, a fresh water spray nozzle that is formed at an upper end of the tower tank and sprays the fresh water from the fresh water pump downward, a first packing material that is formed between the $NH_3$ spray nozzle and the fresh water spray nozzle and contacts the fresh water with $NH_3$ to dissolve $NH_3$ and generate ammonia water, and a cooling jacket that cools heat generated by the tower tank due to a dissolution reaction; and an ammonia water pump that supplies ammonia water from an ammonia water storage tank, which stores ammonia water drained to a lower end of the ammonia water production tower, to an upper end of the $CO_2$ removing unit.

9. The apparatus according to claim 8, wherein the ammonia water production tower comprises a mist removal plate that is formed at the upper end of the tower tank in a curved multi-plate shape and returns mist scattered from the fresh water toward the first packing material.

10. The apparatus according to claim 8, further comprising a $NH_3$ supply pipe through which $NH_3$ exhausted to the upper end of the ammonia water production tower is supplied to an lower end of the $CO_2$ removing unit.

11. The apparatus according to claim 8, wherein the first packing material comprises multi-stage distilling column packings designed to increase a contact area per unit volume.

12. The apparatus according to claim 11, wherein a solution redistributor is formed between the multi-stage distilling column packings.

13. The apparatus according to claim 8, wherein a diameter and a height of the tower tank are designed so that a flow velocity of the fresh water and a flow velocity of the $NH_3$ are ½ of a flooding velocity.

14. The apparatus according to claim 8, wherein the loss and lack of $NH_3$ are compensated for by supplying $NH_3$ from the ammonia recycling unit through the $NH_3$ spray nozzle of the ammonia water producing unit or supplying $NH_3$ from a separate $NH_3$ storage tank when the loss and lack of $NH_3$ occur.

15. The apparatus according to claim 8, wherein the $CO_2$ removing unit comprises:

an ammonia water spray nozzle that is connected to the ammonia water pump and sprays ammonia water downward;

a second packing material that contacts $CO_2$ with the ammonia water and converts $CO_2$ into $NH_4HCO_3$(aq);

a cooling jacket that is formed in multi-stages for each section of an absorption apparatus filled with the second packing material and cools heat generated by a $CO_2$ removal reaction;

a water spray that collects $NH_3$ discharged to the outside without reacting with $CO_2$;

a mist removal plate that is formed in a curved multi-plate shape and returns the ammonia water toward the second packing material;

a partition wall that is formed so that the ammonia water does not flow backward; and an umbrella-shaped blocking plate that covers an exhaust gas inlet hole of the partition wall.

16. The apparatus according to claim 8, wherein the ammonia recycling unit comprises:

a $Ca(OH)_2$ storage tank that stores $Ca(OH)_2$;

a mixing tank in which $NH_4HCO_3(aq)$ discharged from the absorption tower is stirred with $Ca(OH)_2$ by an agitator to generate $CaCO_3(s)$ and $H_2O$ and $NH_3(g)$ is recycled;

a filter that suctions a solution and precipitate from the mixing tank and separates $CaCO_3(s)$;

a high-pressure pump that transfers the solution and precipitate to the filter at high pressure; and a $CaCO_3(s)$ storage tank that stores a slurry or $CaCO_3(s)$ of a solid state.

17. The apparatus according to claim 16, wherein ammonia water or fresh water separated by the filter is supplied to the ammonia water producing unit, or excess ammonia water or excess fresh water additionally generated by the mixing tank compared to a total circulating fresh water is stored in the fresh water tank.

18. The apparatus according to claim 8, wherein the ammonia recycling unit comprises:

a $Mg(OH)_2$ storage tank that stores $Mg(OH)_2$;

a mixing tank in which $NH_4HCO_3(aq)$ discharged from the absorption tower is stirred with $Mg(OH)_2$ by an agitator to generate $MgCO_3(s)$ and $H_2O$ and $NH_3(g)$ is recycled;

a filter that suctions a solution and precipitate from the mixing tank and separates $MgCO_3(s)$;

a high-pressure pump that transfers the solution and precipitate to the filter at high pressure; and a $MgCO_3(s)$ storage tank that stores a slurry or $MgCO_3(s)$ of a solid state.

19. The apparatus according to claim 18, wherein ammonia water or fresh water separated by the filter is supplied to the ammonia water producing unit, or excess ammonia water or excess fresh water additionally generated by the mixing tank compared to a total circulating fresh water is stored in the fresh water tank.

20. The apparatus according to claim 1, further comprising a discharge unit comprising:

a cleaning water tank that stores cleaning water discharged from the absorption tower;

a water treatment device comprising a filtering unit that controls turbidity to satisfy an outboard discharge condition of the cleaning water transferred to the cleaning water tank by a transfer pump, and a neutralizing agent injecting unit that controls pH; and a sludge storage tank that separates and stores solid emissions.

* * * * *